(12) United States Patent
Sprouse et al.

(10) Patent No.: US 8,663,348 B2
(45) Date of Patent: Mar. 4, 2014

(54) APPARATUS FOR REMOVING HEAT FROM INJECTION DEVICES AND METHOD OF ASSEMBLING SAME

(75) Inventors: Kenneth M. Sprouse, Northridge, CA (US); Shahram Farhangi, Woodland Hills, CA (US); Robert M. Saxelby, Cedar Park, TX (US); David R. Matthews, Simi Valley, CA (US)

(73) Assignee: General Electric Company, Schenectady, NY (US)

( * ) Notice: Subject to any disclaimer, the term of this patent is extended or adjusted under 35 U.S.C. 154(b) by 803 days.

(21) Appl. No.: 12/854,636

(22) Filed: Aug. 11, 2010

(65) Prior Publication Data

US 2012/0039761 A1 Feb. 16, 2012

(51) Int. Cl.
*B05B 15/00* (2006.01)

(52) U.S. Cl.
USPC .......................................... 48/61; 239/132.3

(58) Field of Classification Search
None
See application file for complete search history.

(56) References Cited

U.S. PATENT DOCUMENTS

| | | | |
|---|---|---|---|
| 4,618,323 A | | 10/1986 | Mansour |
| 4,685,404 A | | 8/1987 | Sheppard et al. |
| 5,643,394 A | * | 7/1997 | Maydan et al. .......... 156/345.33 |
| 5,813,846 A | * | 9/1998 | Newby et al. ..................... 431/9 |
| 5,823,122 A | | 10/1998 | Chronowski et al. |
| 5,947,716 A | * | 9/1999 | Bellamy et al. ............... 431/159 |
| 6,162,266 A | | 12/2000 | Wallace et al. |
| 6,609,905 B2 | * | 8/2003 | Eroglu et al. ................ 431/284 |
| 6,679,049 B2 | | 1/2004 | Kline et al. |
| 6,807,804 B2 | | 10/2004 | Kline et al. |
| 6,820,412 B2 | * | 11/2004 | Kline et al. ..................... 60/251 |
| 2003/0196576 A1 | * | 10/2003 | Whittaker et al. ............ 110/260 |
| 2003/0197071 A1 | * | 10/2003 | Whittaker ..................... 239/404 |
| 2004/0067461 A1 | * | 4/2004 | Ranke et al. ...................... 431/9 |
| 2009/0274594 A1 | * | 11/2009 | Guo et al. ..................... 422/200 |
| 2011/0266364 A1 | * | 11/2011 | Mishra ........................ 239/132.3 |

OTHER PUBLICATIONS

FCCU Feed Injector Cold Flow Modeling 90EN194/91017, Texaco CE&P. Engineering Division, 5 pages.
3 Stream Injector Cold Flow Modeling Results, ChevronTexaco, Feb. 12, 2004, 5 pages.
Duane Brooker, et al., Feed Injector Nozzle Scale-Up Testing: Bete Fog Nozzle Inc., Apr. 4-16, 1994, 73 pages.
National Aeronautics and Space Adminstration, Liquid Rocket Engine Injectors, NASA Space Vehicle Design Criteria (Chemical Propulsion), Mar. 1976, 131 pages, NASA SP-8089, National Technical Information Services, Springfield, Virginia.

* cited by examiner

*Primary Examiner* — Imran Akram
(74) *Attorney, Agent, or Firm* — Armstrong Teasdale LLP

(57) ABSTRACT

A method of assembling an injection device for use in a reactor injector feed assembly includes extending the injection device at least partially into a cavity. The injection device includes a plurality of substantially concentric conduits coupled to a modular tip that includes a plurality of cooling channels and a plurality of substantially annular nozzles defined therein. The method also includes coupling at least one coolant distribution device in flow communication with the plurality of cooling channels to facilitate removing heat from an outer surface of the injection device.

10 Claims, 13 Drawing Sheets

APPARATUS FOR REMOVING HEAT FROM INJECTION DEVICES AND METHOD OF ASSEMBLING SAME

BACKGROUND OF THE INVENTION

The present invention relates generally to injection systems, such as those used in gasification systems, and more particularly, to methods and apparatus to facilitate removing heat from modular tip injection devices used with gasification reactors.

Most known IGCC plants include a gasification system that is integrated with at least one power-producing turbine system. For example, at least some known gasification systems convert a mixture of fuel, air or oxygen, steam, and/or $CO_2$ into a synthetic gas, or "syngas." The syngas is channeled to the combustor of a gas turbine engine, which powers an electrical generator that supplies electrical power to a power grid. Exhaust from at least some known gas turbine engines is supplied to a heat recovery steam generator (HRSG) that generates steam for driving a steam turbine. Power generated by the steam turbine also drives an electrical generator that provides electrical power to the power grid.

At least some known gasification systems include an injection system that supplies a gasification reactor with process fluids to facilitate at least one exothermic reaction. The injection system may include at least one injection device that is partially exposed to such exothermic reactions and the associated high temperatures. Such high temperatures may reduce the useful life span of some of the components within the injection devices.

BRIEF DESCRIPTION OF THE INVENTION

In one aspect, a method of assembling an injection device for use in a reactor injector feed assembly is provided. The method includes extending the injection device at least partially into a cavity. The injection device includes a plurality of substantially concentric conduits coupled to a modular tip that includes a plurality of cooling channels and a plurality of substantially annular nozzles defined therein. The method also includes coupling at least one coolant distribution device in flow communication with the plurality of cooling channels to facilitate removing heat from an outer surface of the injection device.

In another aspect, an injection device for use in a reactor injector feed assembly is provided. The injection device includes a plurality of substantially concentric conduits coupled to a modular tip that includes a plurality of substantially annular nozzles. The injection device also includes an outer surface extending into a cavity such that the outer surface is exposed to a source of heat within the cavity. The injection device further includes a plurality of cooling channels defined within the injection device. Each of the cooling channels is at least one of radially and axially inward of the outer surface. The injection device also includes at least one coolant distribution device coupled in flow communication with the plurality of cooling channels to facilitate removing heat from at least a portion of the outer surface.

In yet another aspect, a gasification facility is provided. The gasification facility includes at least one carbonaceous reactant source and at least one oxygenated fluid reactant source. The gasification facility also includes at least one gasification reactor including at least one injection device coupled in flow communication with the at least one carbonaceous reactant source and the at least one oxygenated fluid reactant source. The at least one injection device includes a plurality of substantially concentric conduits coupled to a modular tip that includes a plurality of substantially annular nozzles. The at least one injection device also includes an outer surface extending into the at least one gasification reactor such that the outer surface is exposed to a source of heat within the at least one gasification reactor. The at least one injection device further includes a plurality of cooling channels defined within the injection device. Each of the cooling channels is at least one of radially and axially inward of the outer surface. The at least one injection device also includes at least one coolant distribution device coupled in flow communication with the plurality of cooling channels to facilitate removing heat from at least a portion of the outer surface.

DETAILED DESCRIPTION OF THE INVENTION

Figure 1:
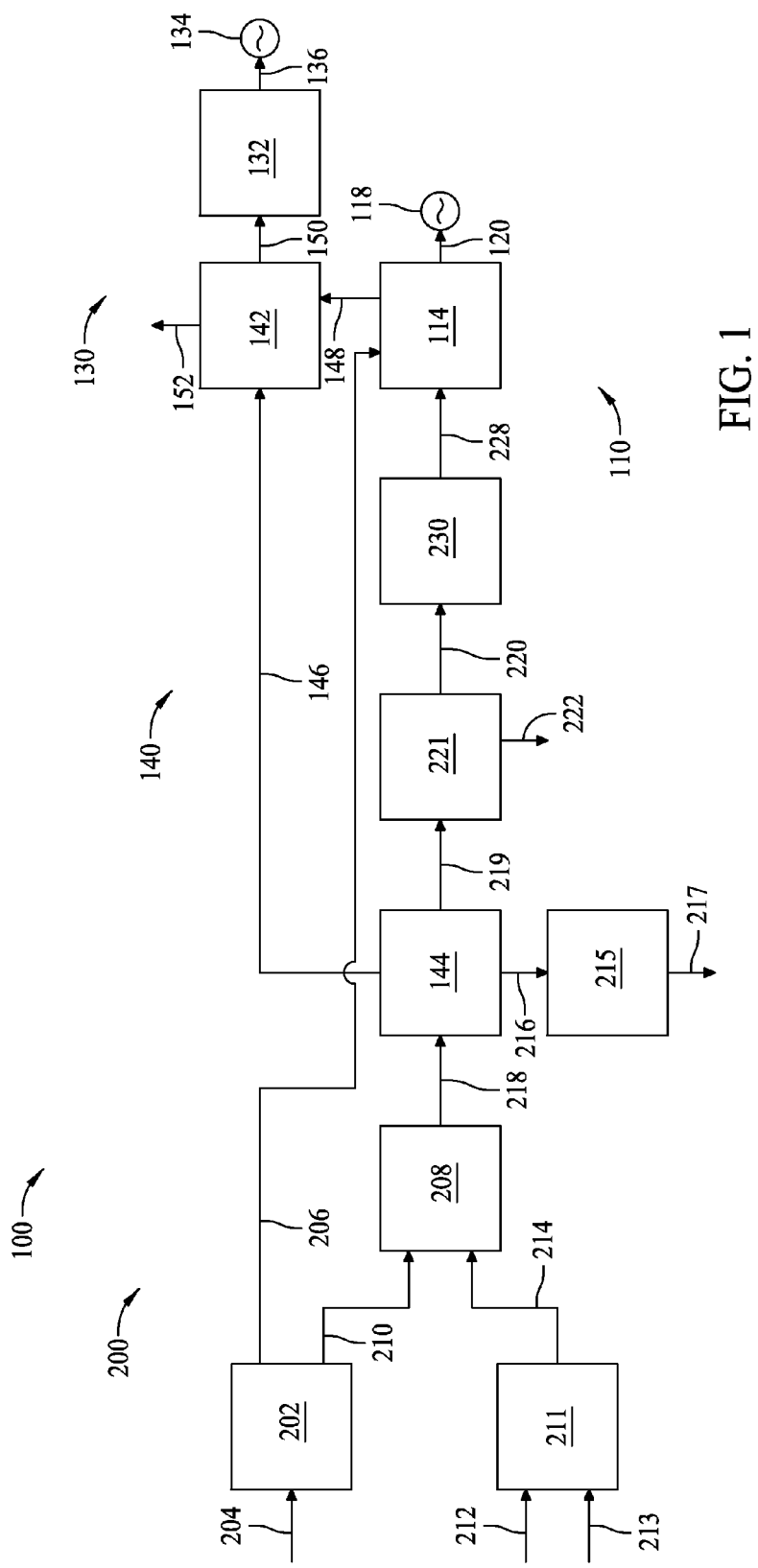
FIG. 1 is a schematic diagram of an exemplary gasification facility.

FIG. 1 is a schematic diagram of an exemplary facility that uses an injection system, specifically, a gasification facility, and more specifically, an exemplary integrated gasification combined-cycle (IGCC) power generation plant 100. Alternatively, the method and apparatus to produce synthetic gas as described herein is used with any facility in any suitable configuration that that enables such method and apparatus including, but not limited to, any combustion facilities, chemical processing facilities, and food processing facilities.

In the exemplary embodiment, IGCC plant 100 includes a gas turbine engine 110. A turbine 114 is rotatably coupled to a first electrical generator 118 via a first rotor 120. Turbine 114 is coupled in flow communication with at least one fuel source and at least one air source (both described in more detail below) and is configured to receive the fuel and air from the fuel source and the air source (neither shown in FIG. 1), respectively. Turbine 114 mixes air and fuel, produces hot combustion gases (not shown), and converts the heat energy within the gases to rotational energy. The rotational energy is transmitted to generator 118 via rotor 120, wherein generator 118 converts the rotational energy to electrical energy (not shown) for transmission to at least one load, including, but not limited to, an electrical power grid (not shown).

IGCC plant 100 also includes a steam turbine engine 130. In the exemplary embodiment, engine 130 includes a steam turbine 132 rotatably coupled to a second electrical generator 134 via a second rotor 136.

IGCC plant 100 further includes a steam generation system 140. In the exemplary embodiment, system 140 includes at least one heat recovery steam generator (HRSG) 142 that receives exhaust gases (not shown) from turbine 114 via an exhaust gas conduit 148 that supplies heat used within HRSG 142 to produce one or more streams of steam from at least one boiler feedwater source that includes, but is not limited to, at least one heated boiler feedwater stream (not shown). HRSG 142 also is coupled in flow communication with at least one heat transfer apparatus 144 via at least one steam conduit 146. Apparatus 144 is also coupled in flow communication with at least one heated boiler feedwater conduit (not shown), wherein apparatus 144 receives heated boiler feedwater (not shown) from the same or a separate boiler feedwater source (not shown). HRSG 142 receives steam (not shown) from apparatus 144 via conduit 146, wherein HRSG 142 facilitates addition of heat energy to the steam. HRSG 142 is coupled in flow communication with turbine 132 via a steam conduit 150. In the exemplary embodiment, the cooled combustion gases are exhausted from HRSG 142 to the atmosphere via stack gas conduit 152. Alternatively, at least a portion of the excess combustion gases from HRSG 142 are channeled for use elsewhere in IGCC plant 100.

Conduit 150 is configured to channel steam (not shown) from HRSG 142 to turbine 132. Turbine 132 is configured to receive the steam from HRSG 142 and convert the thermal energy in the steam to rotational energy. The rotational energy is transmitted to generator 134 via rotor 136, wherein generator 134 is configured to facilitate converting the rotational energy to electrical energy (not shown) for transmission to at least one load, including, but not limited to, the electrical power grid. The steam is condensed and returned as boiler feedwater via a condensate conduit (not shown). Alternatively, at least a portion of the steam from HRSG 142, steam turbine 132 and/or heat transfer apparatus 144 is channeled for use elsewhere in IGCC plant 100.

IGCC plant 100 also includes a gasification system 200. In the exemplary embodiment, system 200 includes at least one air separation unit 202 coupled in flow communication with an air source via an air conduit 204. The air sources include, but are not limited to, dedicated air compressors (not shown) and a compressor (not shown) typically associated with gas turbine engine 110. Unit 202 is configured to separate air into one or more streams of oxygen ($O_2$), nitrogen ($N_2$) and other component streams (neither shown). The other component streams may be released via a vent (not shown) or collected in a storage unit (not shown). In the exemplary embodiment, at least a portion of $N_2$ is channeled to gas turbine 114 via a $N_2$ conduit to facilitate combustion.

System 200 includes a gasification reactor 208 that is coupled in flow communication with unit 202 and is configured to receive the $O_2$ channeled from unit 202 via an $O_2$ conduit 210. System 200 also includes a material grinding and slurrying unit 211. Unit 211 is coupled in flow communication with a carbonaceous material source and a water source (neither shown) via a carbonaceous material supply conduit 212 and a water supply conduit 213, respectively. In the exemplary embodiment, the carbonaceous material is petroleum coke, or pet coke. Moreover, in the exemplary embodiment, Unit 211 is configured to mix the pet coke and water to form a pet coke slurry stream (not shown) that is channeled to reactor 208 via a pet coke slurry conduit 214. Alternatively, any material that includes carbonaceous solids is used that facilitates operation of IGCC plant 100 as described herein. Also, alternatively, non-slurry fuels that include solid, liquid and gaseous fuel substances are used, including mixtures of fuels and other materials, such as but not limited to, fuel and slag additives.

Reactor 208 is configured to receive the material slurry stream and an $O_2$ stream via conduits 214 and 210, respectively. Reactor 208 is also configured to facilitate production of a hot, raw synthetic gas (syngas) stream (not shown). Moreover, reactor 208 is also configured to produce hot slag and char (both not shown) as a by-product of the syngas production.

Reactor 208 is coupled in flow communication with heat transfer apparatus 144 via a hot syngas conduit 218. Apparatus 144 is configured to receive the hot, raw syngas stream and transfer at least a portion of the heat to HRSG 142 via conduit 146. Subsequently, apparatus 144 produces a cooled, raw syngas stream (not shown) that is channeled to a scrubber and low temperature gas cooling (LTGC) unit 221 via a syngas conduit 219. Unit 221 is configured to remove the portion of slag and char entrained within the raw syngas stream (sometimes referred to as "fines") and facilitate removal of the fines via a fines conduit 222. The fines are sent to a waste collection system (not shown) for ultimate disposal and/or recirculated back into gasification reactor 208 to take advantage of unused carbon content within the fines. Unit 221 is also configured to further cool the raw syngas stream.

Apparatus 144 also facilitates removal of slag and char from the hot, raw syngas stream. Specifically, a slag and char handling unit 215 is coupled in flow communication with apparatus 144 via a hot slag conduit 216. Unit 215 is configured to quench the balance of the char and slag, simultaneously breaking up the slag into small pieces wherein a slag and char removal stream (not shown) is produced and channeled through conduit 217. In a manner similar to the fines discussed above, the slag and char are channeled to a waste collection subsystem (not shown) for ultimate disposal and/or recirculated back into gasification reactor 208 to take advantage of unused carbon within the slag and char.

System 200 further includes an acid gas removal subsystem 230 that is coupled in flow communication with unit 221 and is configured to receive the cooled raw syngas stream via a raw syngas conduit 220. Subsystem 230 is also configured to facilitate removal of at least a portion of acid components (not shown) from the raw syngas stream as discussed further below. Such acid gas components include, but are not limited to, $H_2S$ and $CO_2$. Subsystem 230 is further configured to facilitate separation of at least some of the acid gas components into components that include, but are not limited to, $H_2S$ and $CO_2$. In the exemplary embodiment, $CO_2$ is not recycled and/or sequestered. Alternatively, subsystem 230 is coupled in flow communication with reactor 208 via at least one $CO_2$ conduit (not shown) wherein a stream of $CO_2$ (not shown) is channeled to predetermined portions of reactor 208. The removal of such $CO_2$ and $H_2S$ via subsystem 230 facilitates producing a clean syngas stream (not shown) that is channeled to gas turbine 114 via a clean syngas conduit 228.

In operation, air separation unit 202 receives air via conduit 204. The air is separated into $O_2$, $N_2$ and other components. The other components are vented or collected, wherein at least a portion of $N_2$ is channeled to turbine 114 via a conduit 206 and at least a portion of $O_2$ is channeled to gasification reactor 208 via conduit 210. Remaining portions of N₂ and O₂ may be channeled as a plurality of streams to other portions of IGCC 100 as needed, including, but not limited to, storage. Also, in operation, material grinding and slurrying unit 211 receives pet coke and water via conduits 212 and 213, respectively, forms a pet coke slurry stream and channels the pet coke slurry stream to reactor 208 via conduit 214.

Reactor 208 receives the O₂ via conduit 210, pet coke via conduit 214. Reactor 208 facilitates production of a hot raw syngas stream that is channeled to apparatus 144 via conduit 218. Some of the slag by-product that is formed in reactor 208 is removed via slag handling unit 215 and conduits 216 and 217. Apparatus 144 facilitates cooling the hot raw syngas stream to produce a cooled raw syngas stream that is channeled to scrubber and LTGC unit 221 via conduit 219 and the syngas is cooled further. Particulate matter, including some of the slag and char (in the form of fines), is removed from the syngas via conduit 222. The cool raw syngas stream is channeled to acid gas removal subsystem 230 wherein acid gas components are selectively removed such that a clean syngas stream is formed and channeled to gas turbine 114 via conduit 228.

Further, in operation, turbine 114 receives N₂ and clean syngas via conduits 206 and 228, respectively. Turbine 114 compresses air from at least one air source (not shown) that turbine 114 subsequently mixes and combusts with the syngas fuel, producing hot combustion gases. Turbine 114 channels the hot combustion gases to induce rotation of turbine 114 which subsequently rotates first generator 118 via rotor 120. At least a portion of the exhaust gases are channeled to HRSG 142 from turbine 114 via an exhaust gas conduit 148 to facilitate generating steam.

At least a portion of the heat removed from the hot syngas via heat transfer apparatus 144 is channeled to HRSG 142 as steam via conduit 146. HRSG 142 receives the steam from apparatus 144, together with one or more streams of boiler feed water, as well as the exhaust gases from turbine 114. Heat is transferred from the exhaust gases to the one or more streams of boiler feedwater as well as the steam from apparatus 144, thereby producing one or more subsequent streams of steam as well as increasing the heat energy contained in the steam from apparatus 144. In the exemplary embodiment, at least one of the streams of steam generated as described above is heated to superheated conditions. Alternatively, one or more of the aforementioned streams of steam are mixed together to form one or more mixed streams that may be heated to superheated conditions. Alternatively, high temperature saturated steam is formed. At least a portion of the superheated steam is channeled to steam turbine 132 via conduit 150 and induces a rotation of turbine 132. Turbine 132 rotates second generator 134 via second rotor 136. A remaining portion of the steam is channeled for use elsewhere within IGCC plant 100.

Figure 2:
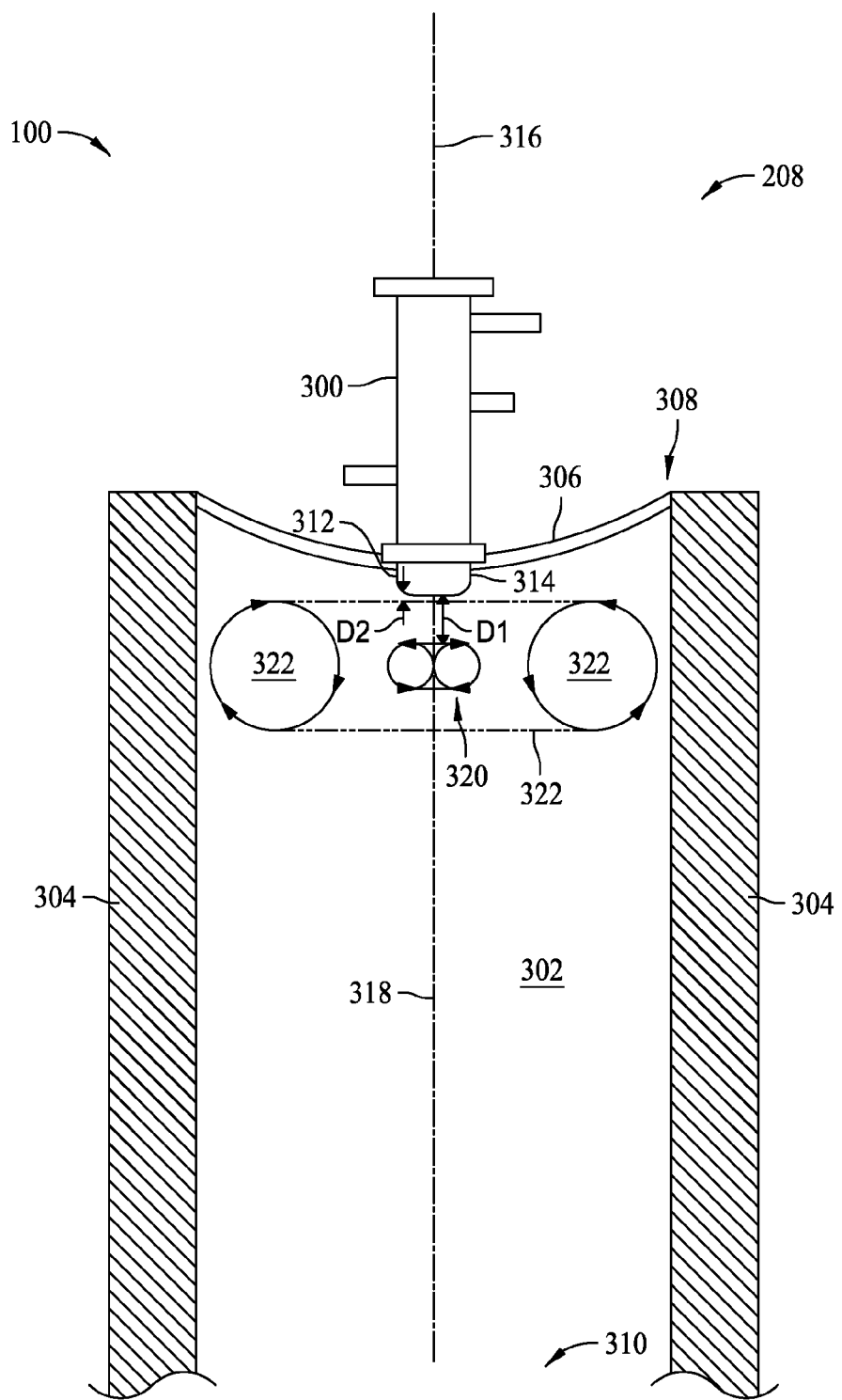
FIG. 2 is a schematic cross-sectional view of a gasification reactor that may be used for synthetic gas generation, such as may be used with the gasification facility shown in FIG. 1.

FIG. 2 is a schematic cross-sectional view of gasification reactor 208 that may be used for synthetic gas generation, such as may be used with IGCC power generation plant 100. Reactor 208 includes at least one injection device 300 that is coupled in flow communication with a gasification cavity 302. In the exemplary embodiment, device 300 is an annular triplet gasifier injector nozzle as described herein, thereby including three annular passages (described further below). Alternatively, device 300 is any suitable injector nozzle that includes, but is not limited to, configurations with four or more annular passages. Further, alternatively, device 300 is any suitable injector nozzle that includes, but is not limited to, three or more concentric passages, wherein each passage is coupled in flow communication with the annular passages described above in any suitable configuration that facilitates operation of injection device 300 as described herein.

Cavity 302 is at least partially defined by a substantially cylindrical reactor wall 304 and a head end cover 306. In the exemplary embodiment, gasification reactor 208 is substantially cylindrical. Alternatively, reactor 208 includes any configuration that facilitates operation of reactor 208 as described herein. Also, in the exemplary embodiment, device 300 has a substantially vertical orientation (described further below) wherein device 300 penetrates the top of reactor 208 and points substantially downward. Alternatively, device 300 has any orientation including, but not limited to, substantially horizontal orientations.

In the exemplary embodiment, wall 304 includes at least one ceramic refractory material that includes, but is not limited to, heat tempered bricks. Alternatively, wall 304 is fluid-cooled, wherein the cooling fluids include, but are not limited to water and/or steam. Cover 306 is sealingly coupled to at least a portion of a head end portion 308 of reactor 208. Cavity 302 is also partially defined by a tail end cover (not shown) that is sealingly coupled to at least a portion of wall 304, wherein the tail end cover is positioned on a tail end portion 310 that is in opposition to portion 308. Alternatively, cover 306, head end portion 308, the tail end cover and tail end portion 310 are oriented in any suitable position relative to wall 304, including any orientation that facilitates operation of reactor 208 as described herein. Furthermore, wall 304 may be of any configuration that facilitates operation of reactor 208 as described herein. Moreover, alternatively, reactor 208 has any suitable configuration that facilitates operation of IGCC 100 as described herein.

Injector device 300 includes a tip portion 312 that is inserted through an aperture 314 defined in head end cover 306 and sealingly coupled to head end cover 306 using a fastening method that includes, but is not limited to, retention hardware (not shown). Reactor 208 is configured such that an axial centerline 316 of injector device 300 is collinear with a longitudinal centerline 318 of gasification cavity 302. Tip portion 312 is configured to form a plurality of recirculation zones within cavity 302. Specifically, tip portion 312 is configured to form a first recirculation zone 320 a first distance $D_1$ from tip portion 312 within gasification cavity 302. Recirculation zone 320 has a shape that is substantially toroidal and the shape is one of substantially spatially continuous or partially segmented. Moreover, recirculation zone 320 is positioned close to and, with respect to centerline 318, substantially centered about centerline 318. Also, specifically, tip portion 312 is configured to form a second recirculation zone 322 a second distance $D_2$ from tip portion 312 within gasification cavity 302. Recirculation zone 322 has a shape that is substantially toroidal and the shape is one of substantially spatially continuous or partially segmented. Moreover, recirculation zone 322 is positioned with respect centerline 318, that is, substantially centered about centerline 318, and in close proximity to wall 304. First recirculation zone 320 is proximately centered within second recirculation zone 322.

Alternative embodiments of reactor 208 may include a plurality of injection devices 300, wherein each device 300 has a centerline 316, such that each associated centerline 316 is co-linear with a predefined axial orientation similar to centerline 318. Each of such plurality of devices 300 may have either a vertical, i.e., directly upward and/or directly downward, and/or a horizontal orientation, including any orientation between purely vertical and purely horizontal orientations, that facilitates operation of reactor 208 as described herein. Furthermore, such alternative embodiments of reactor 208 may include a plurality of devices 300, wherein all of devices 300 have a substantially similar orientation. Moreover, such alternative embodiments of reactor 208 may include a plurality of devices 300, wherein a first number of such injectors 300 have a differing orientation than a second number of such devices 300.

Still further alternative embodiments of reactor 208 may include a plurality of devices 300 wherein devices 300 are distributed across one or more surfaces of reactor 208, each device 300 with a differing orientation. Moreover, injectors 300 making up at least a portion of plurality of injectors 300 may each be placed in a dedicated cavity (not shown) that is a part of, or otherwise joined with, reactor 208, thereby facilitating separate formation or development of multiple recirculation zones from each such injector 300.

Figure 3:
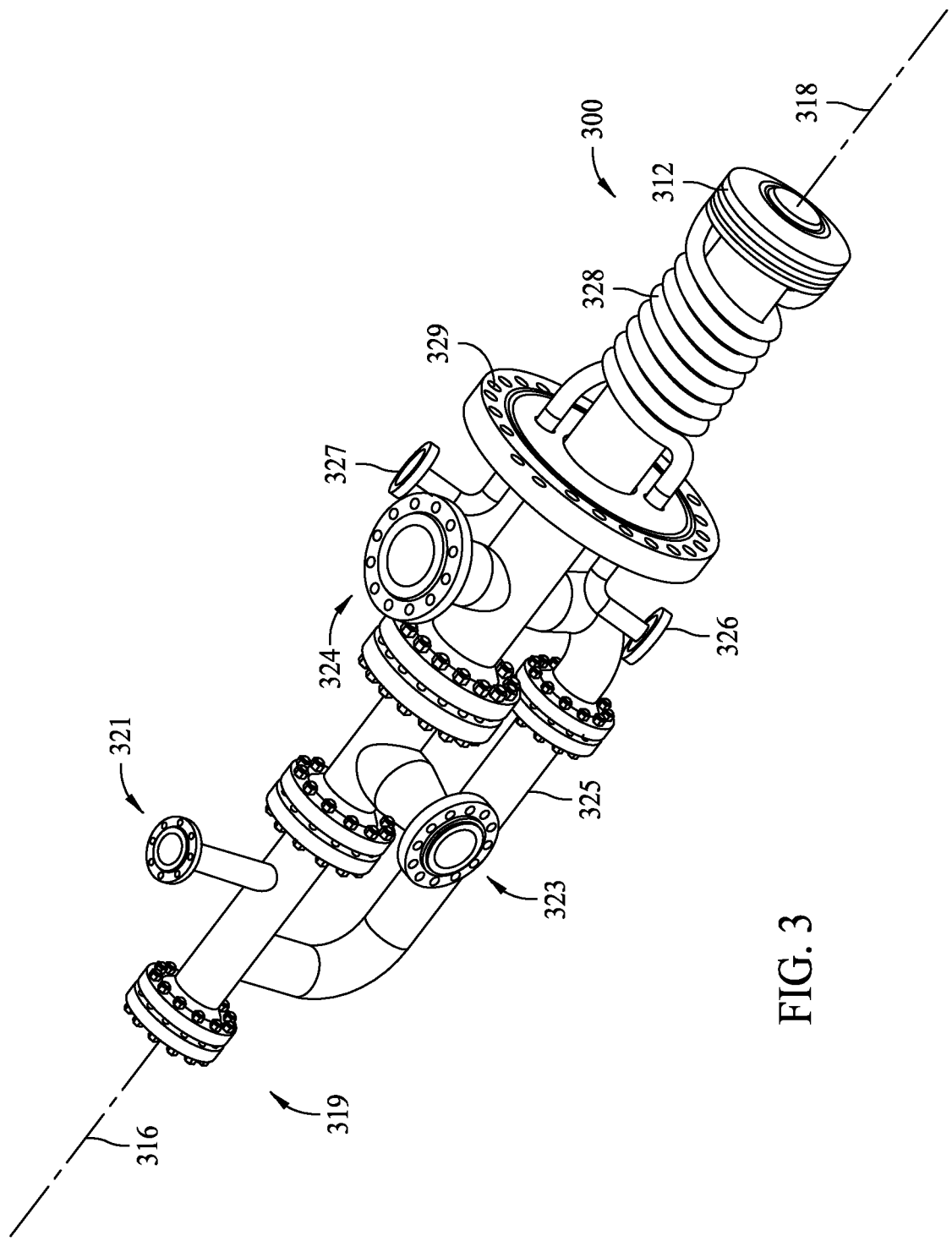
FIG. 3 is a schematic perspective view of an exemplary injector feed assembly that may be used with the gasification reactor shown in FIG. 2.

FIG. 3 is a schematic perspective view of an exemplary injector feed assembly 319 that may be used with gasification reactor 208 (shown in FIG. 2). Injection device axial centerline 316 and gasification cavity longitudinal centerline 318 are illustrated for perspective. In the exemplary embodiment, injector feed assembly 319 is a bayonet assembly. Specifically, assembly 319 includes a first bayonet section, that is, an inner oxygen ($O_2$) supply section 321 that is coupled in flow communication to an $O_2$ source similar to $O_2$ conduit 210 (shown in FIG. 1). Assembly 319 also includes a second bayonet section, that is, a middle slurry section 323 that is coupled in flow communication to a slurry source similar to material slurry conduit 214 (shown in FIG. 1). Assembly 319 further includes a third bayonet section, that is, an outer $O_2$ supply section 324 that is coupled in flow communication to an $O_2$ source similar to $O_2$ conduit 210. At least a portion of section 324 extends about at least a portion of section 323, at least a portion of section 323 extends about at least a portion of section 321, and, at least a portion of section 324 extends about at least a portion of section 321. Moreover, sections 321, 323, and 324 terminate where they join tip 312 in flow communication. Therefore, sections 321, 323 and 324 define a plurality of substantially concentric passages or channels, or, specifically, an inner $O_2$ channel, a middle slurry channel, and an outer $O_2$ channel (neither shown in FIG. 3) within assembly 319.

Assembly 319 also includes an $O_2$ bypass line 325 that establishes at least some flow communication between bayonet sections 324 and 321 such that a predetermined $O_2$ mass flow rate distribution is facilitated based at least partially upon cumulative predetermined $O_2$ pressure drops that occur as $O_2$ is channeled through bayonet sections 321 and 324, $O_2$ bypass line 325, and subsequent components as $O_2$ is discharged from assembly 319. Therefore, maintaining predetermined ratios of an outer $O_2$ mass flow rate and an inner $O_2$ mass flow rate (neither shown) are facilitated. Bypass line 325 facilitates installation and operation of assembly 319 in retrofits of gasification reactor 208. Alternatively, methods that include, but are not limited to flow orifices and manually-operated and automated throttle valves are used in conjunction with, or in lieu of, bypass line 325.

Assembly 319 further includes a cooling fluid inlet manifold 326 and a cooling fluid outlet manifold 327 coupled in flow communication with tip portion 312 of injection device 300 via a plurality of cooling fluid coils 328. Manifolds 326 and 327 and coils 328 facilitate channeling a cooling fluid to remove heat from tip portion 312 (discussed in more detail below). Assembly 319 also includes a mounting flange 329 that is removably and sealingly coupled to head end cover 306 using a fastening method that includes, but is not limited to, retention hardware (not shown). Alternatively, assembly 319 includes at least one cooling jacket with cooling fluid supply and return means integral with at least a portion of outer $O_2$ supply section 324 between mounting flange 329 and tip portion 312 that facilitates channeling of cooling fluid to remove heat from tip portion 312. Also, alternatively, assembly 319 has any number of coolant connections and/or coolant flow means that facilitate operation of injection device 300 as described herein.

Figure 4:
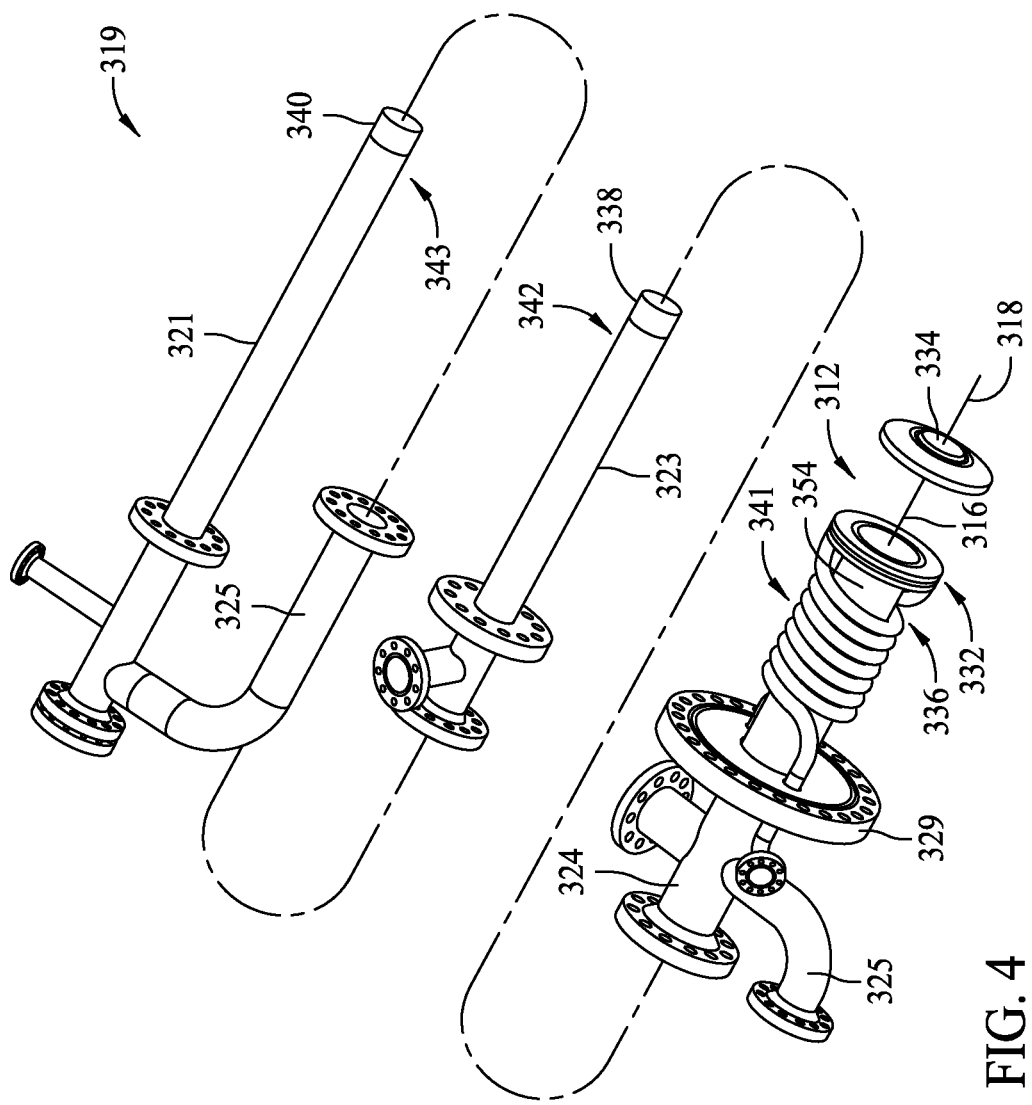
FIG. 4 is an exploded view of the exemplary injector feed assembly shown in FIG. 3.

FIG. 4 is an exploded view of the exemplary injector feed assembly 319. In the exemplary embodiment, inner oxygen supply section 321 is positioned at least partially within slurry supply section 323, which is at least partially positioned within outer oxygen supply section 324. Assembly 319 has a "bayonet" design, wherein sections 321, 323, and 324 hereon are also referred to as bayonets and/or bayonet sections 321, 323, and 324. Bayonet section 321 includes an end 343, bayonet section 323 includes an end 342, and bayonet section 321 includes an end 341.

Figure 5:
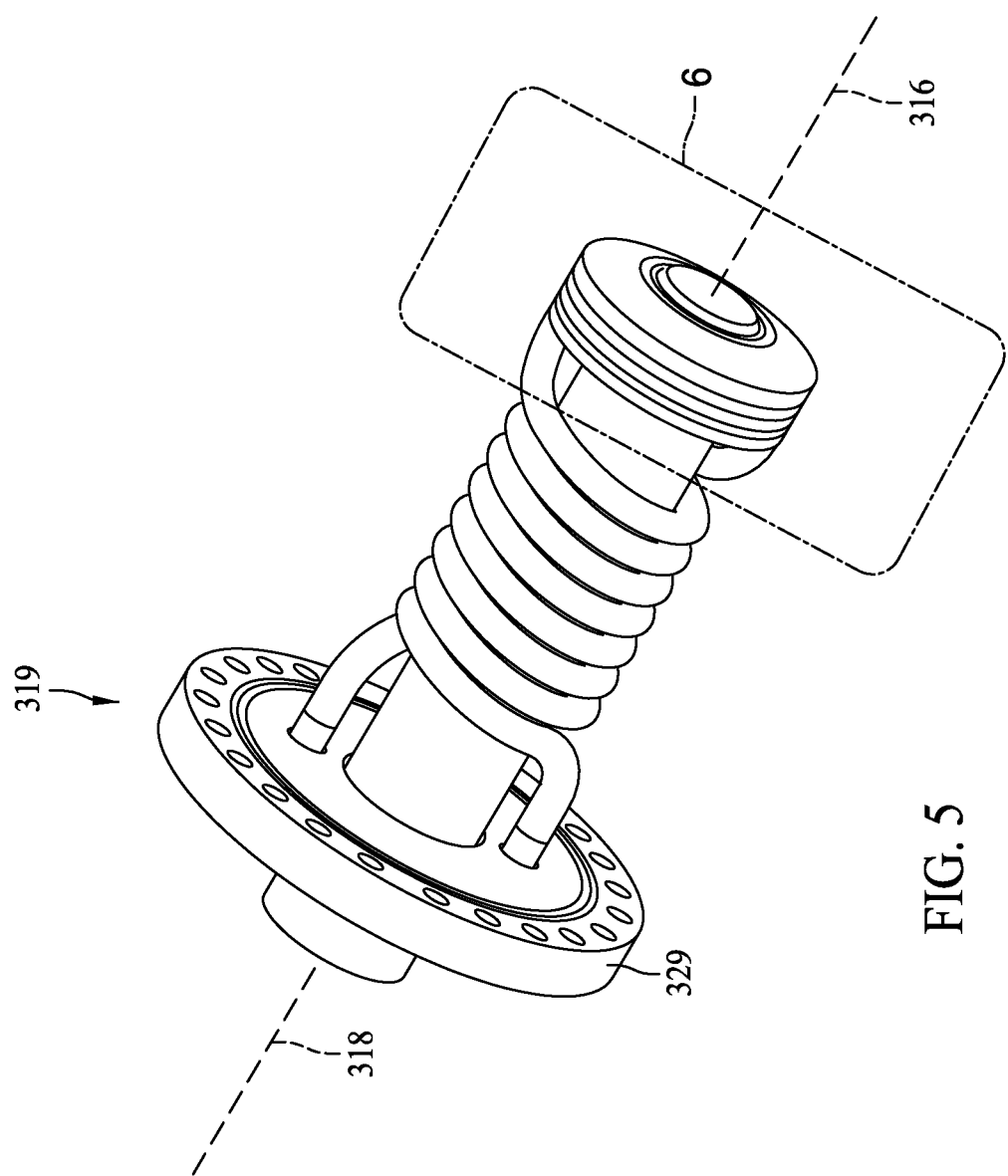
FIG. 5 is a schematic perspective view of a portion of the exemplary injector feed assembly shown in FIG. 3.
Figure 6:
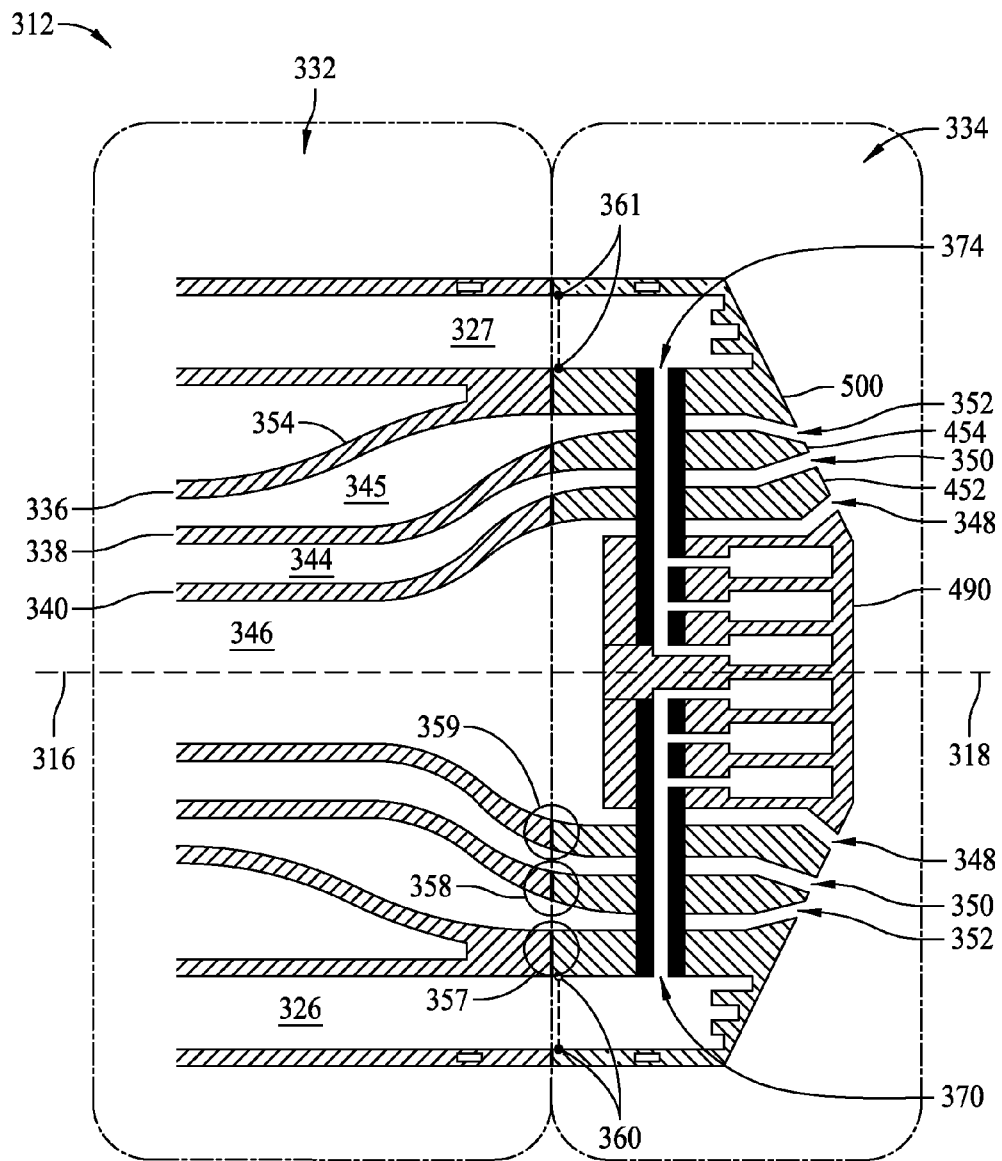
FIG. 6 is a schematic cross-sectional view of a tip portion of an injection device that may be used with the injector feed assembly of FIG. 5 taken along area 6.
Figure 7:
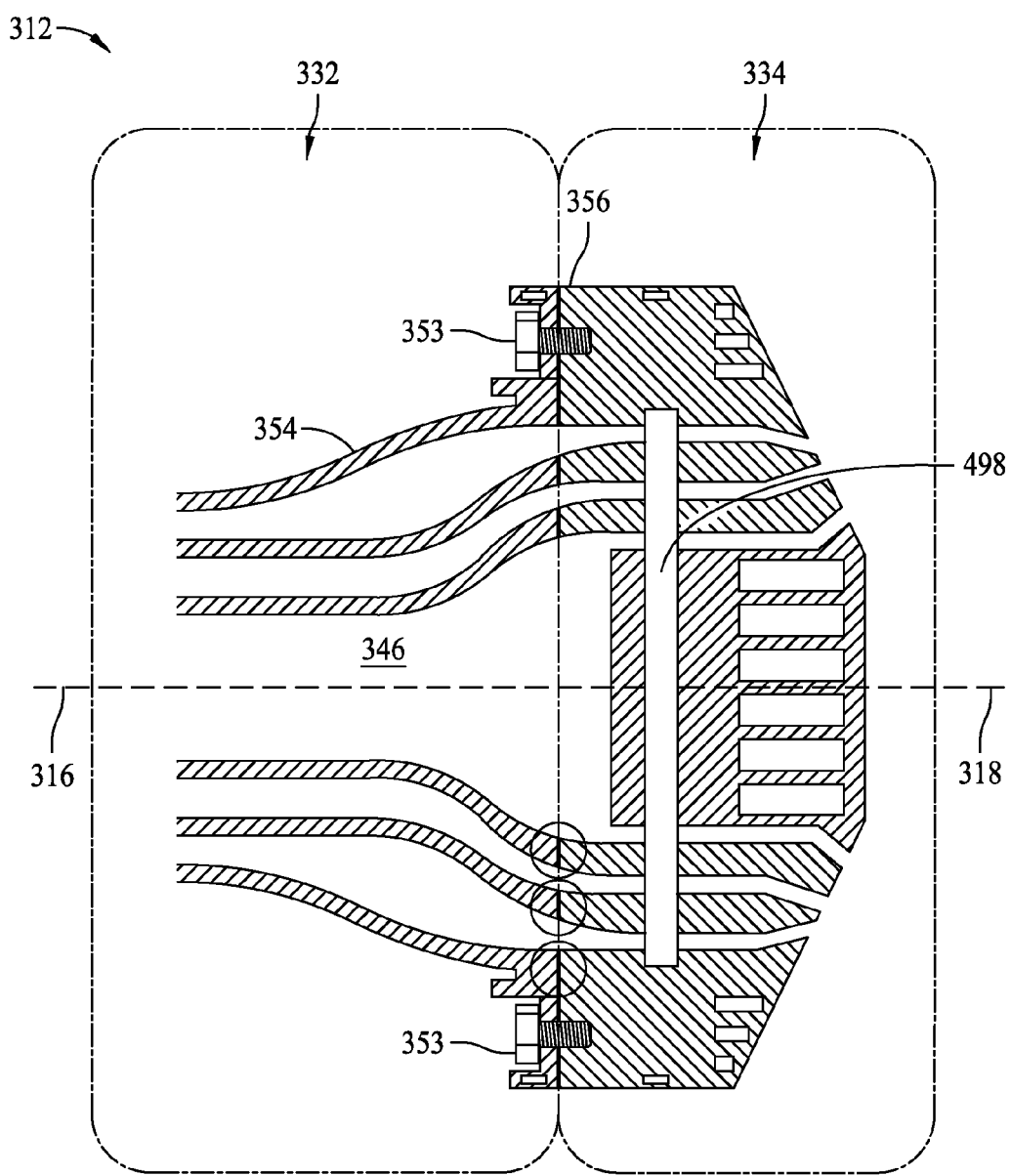
FIG. 7 is another schematic cross-sectional view of the exemplary tip portion shown in FIG. 6.

FIG. 5 is a schematic perspective view of a portion of injector feed assembly 319, including area 6. FIG. 6 is a schematic cross-sectional view of tip portion 312 of injector feed assembly 319 taken along area 6 (shown in FIG. 5). FIG. 7 is another schematic cross-sectional view of tip portion 312 that is oriented 90° about axial centerline 316 from the perspective shown in FIG. 6. Tip portion 312 controls the distribution of flow of reactant supply fluids between injector feed assembly 319 and gasification cavity 302 (shown in FIG. 2). FIG. 7 shows a support pin 498.

Moreover, as illustrated in the exemplary embodiment, adapter portion 332 includes three substantially annular adapters: an outer gaseous oxygen (GOX) bayonet adapter 336, a slurry bayonet adapter 338, and an inner GOX bayonet adapter 340. Bayonet adapters 336, 338, and 340 are coupled in flow communication with bayonet sections 324, 323 and 321 (all shown in FIG. 3), respectively. More specifically, outer GOX bayonet adapter 336 is coupled to an end 341 of bayonet section 324 (both shown in FIG. 4). Slurry bayonet adapter 338 is coupled to an end 342 of bayonet section 323 (both shown in FIG. 4). Inner GOX bayonet adapter 340 is coupled to an end 343 of bayonet section 321 (both shown in FIG. 4).

In the exemplary embodiment, adapter portion 332 may be fabricated as a plurality of extensions of bayonet sections 321, 323, and 324 of assembly 319, rather than as a component or components of tip portion 312. That is, in the exemplary embodiment, outer GOX bayonet adapter 336, slurry bayonet adapter 338, and inner GOX bayonet adapter 340 are separate pieces that are individually coupled to bayonet sections 321, 323, and 324, respectively, during assembly of injector feed assembly 319. Alternatively, at least two of bayonet adapters 336, 338, and 340 are coupled together to form a single piece. That is, alternatively, tip portion 312 includes an integrated, unitarily-formed bayonet adapter portion 332 and a modular tip 334, wherein adaptor portion 332 is coupled to bayonet sections 321, 323, and 324 of assembly 319.

In the exemplary embodiment, slurry bayonet adapter 338 and inner GOX bayonet adapter 340 partially define a reactant, or slurry, channel 344. Slurry channel 344 is in flow communication with a middle coal slurry channel (not shown) defined and extending within assembly 319 (shown in FIG. 3). In the exemplary embodiment, slurry bayonet adapter 338 and outer GOX bayonet adapter 336 partially define an outer reactant channel, that is, an outer GOX channel 345, and inner GOX bayonet adaptor 340 partially defines an inner reactant channel, that is, an inner GOX channel 346. Inner GOX channel 346 and outer GOX channel 345 are coupled in flow communication with an inner and an outer oxygen channel (neither shown) defined and extending within assembly 319. Alternatively, either of channels 345 and 346 are oriented to channel any process fluid that facilitates operation of gasification reactor 208 including, but not limited to, steam, nitrogen and carbon dioxide, and channels 345 and 346 are coupled in flow communication with the appropriate fluid sources.

Adapter portion 332 is coupled to injector feed assembly 319 via known methods such as, but not limited to, welding, brazing, and/or retention hardware (not shown).

To form the first recirculation zone 320 and the second recirculation zone 322 (both shown in FIG. 2), tip portion 312 includes both diverging and converging nozzles. More specifically, a plurality of nozzles are formed within modular tip 334 including an inner GOX nozzle 348, a slurry nozzle 350, and an outer GOX nozzle 352. Inner GOX nozzle 348 and slurry nozzle 350 direct respective process fluids away from injector axial centerline 316, and are referred to as diverging nozzles. Outer GOX nozzle 352 directs a respective process fluid toward injector axial centerline 316, and is therefore referred to as a converging nozzle. Alternatively, outer GOX nozzle 352 is either a divergent nozzle or a parallel nozzle with respect to injector axial centerline 316.

Injection device 300, that includes injector feed assembly 319 with tip portion 312 having both diverging and converging nozzles including nozzles 348, 350, and 352, facilitates mixing of the reactant streams, that is, the slurry and GOX streams (neither shown) at predetermined angles with predetermined momentums. Nozzles 348, 350, and 352 also facilitate improving an efficiency of chemical reactions between the slurry and oxygen.

Orienting and configuring nozzles 348, 350, and 352 as discussed herein has beneficial results that include, but are not limited to, facilitating vaporization of the reactants. Specifically, forming recirculation zones 320 and 322 facilitates increasing a residence time of the slurry and GOX such that exothermic reactions between the carbonaceous material and GOX occur more effectively. Moreover, an additional benefit of forming such recirculation zones 320 and 322 in the vicinity of head end portion 308 (shown in FIG. 2) facilitates increasing heat release in that vicinity, and therefore facilitates vaporization of water in the slurry stream. However, due to localized exothermic reactions and associated heat releases, portions of injection device 300, that is, at least one outer surface of injection device 300, is exposed to hot syngas (not shown) including, but not limited to, a radially inner external surface 354 (also shown in FIG. 4) of tip portion 312 and a radially outer external surface 356 of tip portion 312. Such high temperature exposures are discussed further below.

In general, initial assembly of, as well as post-commissioning field service and maintenance disassembly and reassembly of known injector assemblies are each complicated by including both diverging and converging nozzles within such injector assemblies. For example, in most cases, it is difficult to remove a known bayonet having a diverging tip that at least partially forms a diverging nozzle from a next larger known bayonet if the larger bayonet has a converging tip with a converging nozzle that is similar to, or smaller in size than the diverging tip, since such converging tip may interfere with axial removal of such diverging tip. Therefore, partial disassembly of tip portion 312 by disassembly of divergent nozzles 348 and 350 from convergent nozzle 352 is especially difficult. One method of disassembly where such interferences occur between the nozzles in the injector includes removing the injector (that is, injector 300 as described herein) from the reactor cavity (that is, cavity 302 as described herein and shown in FIG. 2), and cutting off the tips of the known bayonets.

However, in the exemplary embodiment, modular tip 334 simplifies assembly, disassembly, and field service of injection device 300 while facilitating the use of a combination of diverging and converging nozzles 348, 350, and 352. This simplification is achieved since the converging and diverging nozzles 348, 350, and 352 are formed within modular tip 334, which is releasably coupled to adapter portion 332. Bayonet adapters 336, 338, and 340 are sized such that each adapter and respective bayonet can be removed from the next larger adapter and respective bayonet when modular tip 334 is not coupled to adapter portion 332.

In the exemplary embodiment, modular tip 334 is fabricated as a single component from a plurality of individual components that are joined together by known coupling methods including, for example, brazing or welding. Alternatively, one-piece modular tip 334 may be formed by methods that include direct metal laser sintering. One-piece modular tip 334 is coupled in flow communication with adapter portion 332. Modular tip 334 may be fabricated as one-piece to achieve a desired degree of nozzle precision and also to ease field assembly and disassembly. Also, in the exemplary embodiment, modular tip 334 is removably coupled to adapter portion 332 via known coupling methods that include, but are not limited to, retention hardware 353 (discussed further below). Alternatively, modular tip 334 is removably coupled to adapter portion 332 via any known coupling methods that enable operation of modular tip 334 as described herein. Retention hardware 353 and external surface 354 are proximate to each other.

Further, in the exemplary embodiment, tip portion 312, which includes modular tip 334 and adaptor portion 332 removably coupled together via retention hardware 353 rather than welded together, also includes a plurality of seals that are used to maintain separation between slurry channel 344, outer GOX channel 345, inner GOX channel 346, cooling water manifold 326, cooling water manifold 327, and a flow of hot syngas (not shown) within cavity 302 that is external to injector feed assembly 319. More specifically, in the exemplary embodiment, a seal assembly 357 maintains a separation between outer GOX channel 345 and the syngas contacting external surface 354. Moreover, a seal assembly 358 maintains a separation between outer GOX channel 345 and slurry channel 344. In addition, a seal assembly 359 maintains a separation between slurry channel 344 and inner GOX channel 346. Furthermore, a seal assembly 360 facilitates maintaining a separation between cooling fluid inlet manifold 326, outer GOX channel 345, and hot syngas that contacts external surface 354. Still further, a seal assembly 361 facilitates maintaining separation between cooling fluid outlet manifold 327, outer GOX channel 345, and hot syngas that contacts external surface 354. Seal assemblies 357, 358, 359, 360, and 361 are manufactured from any materials in any configuration that enables operation of modular tip 334 as described herein including, without limitation, metallic seals, o-rings, and e-seals, singular or redundant seals, and any combination thereof.

Each of seal assemblies 357, 358, 359, 360, and 361 facilitates preventing unintended mixing of the process fluids and coolants used in the gasification process while utilizing an injector tip that includes multiple components that are not connected together by welding or brazing. Specifically, during assembly of tip portion 312 that includes coupling adapter portion 332 to modular tip 334, the shapes of the mating surfaces of adaptor portions 332, 338 and 340 and tip 322, seal assemblies 360 and 361 facilitate alignment and attainment of predetermined gaps between portions 332, 338 and 340 and tip 334 to attain a predetermined gap (not shown)

therebetween to further facilitate secure coupling of portions 332, 338 and 340 with tip 334. This is at least partially due to seal assemblies 360 and 361 having smaller diameters than seal assemblies 357, 358, and 359, thereby seal assemblies 360 and 361 are more likely to attain a full circumferential crush thereon. Also, specifically, seal assemblies 357, 358, and 359 facilitate providing a greater tolerance range within tip 334 to facilitate a greater tolerance for variances due to fabrication and assembly, and shifting and movement of components therein. Alternatively, one of seals 357, 358 or 359 may be used to facilitate the alignment and attainment of predetermined gaps between portions 332, 338 and 340 with tip 334. Further alternatively, any means known to those familiar with the art may be used to facilitate alignment and attainment of predetermined gaps between portions 332, 338, and 340 with tip 334.

Moreover, in the exemplary embodiment, tip portion 312 includes one of coolant supply conduit 370 and one coolant return conduit 374, wherein such conduits 370 and 374 include, but are not limited to, plenums, chambers, and channels (neither shown). In the exemplary embodiment, conduit 370 and conduit 374 are positioned on opposite sides of centerlines 316 and 318. Alternatively, a plurality of conduits 370 and 374 are used, wherein the plurality of conduits 370 are positioned adjacent to each other on one side of centerlines 316 and 318, while each of conduits 374 are positioned adjacent to each other on the opposite side of centerlines 316 and 318. Also, alternatively, conduits 370 and 374 are positioned in an alternating manner about centerlines 316 and 318. Further, alternatively, one or more bifurcated conduits may be used in place of conduits 370 or 374, wherein one portion of each such bifurcated conduit operates as a coolant return conduit. Moreover, alternatively, any configuration of conduits 370 and 374 may be positioned in any manner about centerlines 316 and 318 that enable operation of tip portion 312 as described herein.

Figure 8:
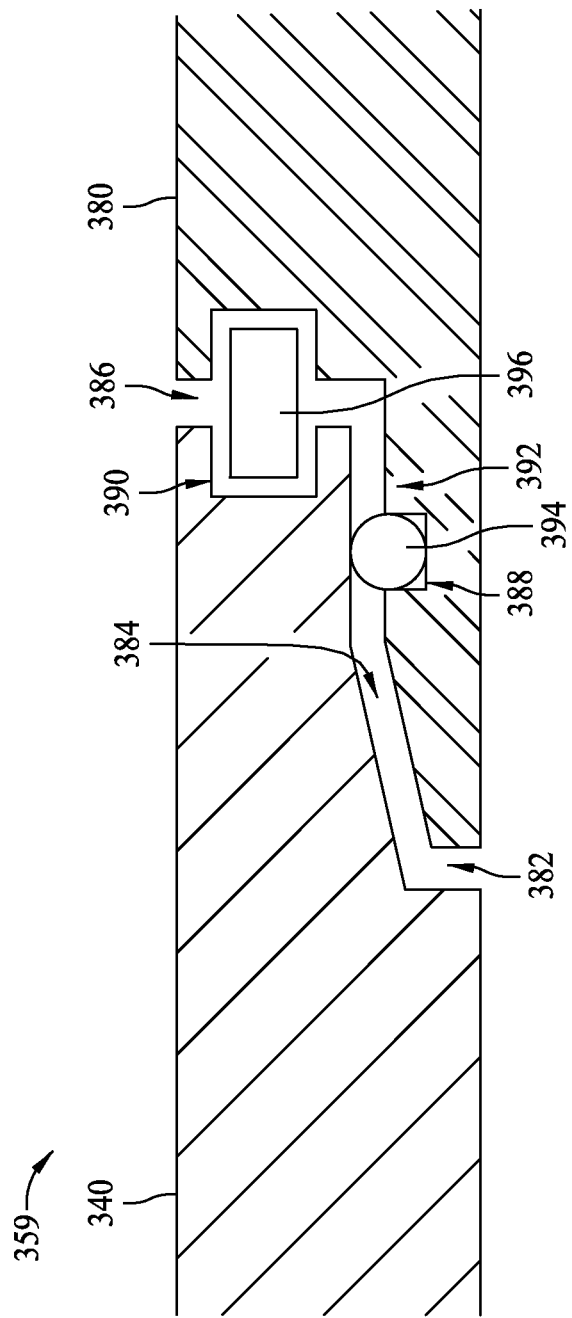
FIG. 8 is a schematic cross-sectional view of an exemplary seal assembly shown in FIGS. 6 and 7.

FIG. 8 is a schematic cross-sectional view of an exemplary seal assembly 359. In the exemplary embodiment, seal assemblies 357 and 358 are substantially similar. A mating end 380 of inner GOX nozzle 348 and inner GOX bayonet adapter 340 define a first longitudinal gap 382, a radial gap 384, and a second longitudinal gap 386, wherein gaps 382, 384, and 386 are in flow communication with each other. Moreover, gaps 382, 384, and 386 extend substantially radially within tip portion 312 (shown in FIGS. 6 and 7). Mating end 380 and bayonet adapter 340 also define a first seal gland 388 and a second seal gland 390, wherein both glands 388 and 390 extend substantially radially within tip portion 312. In the exemplary embodiment, seal assembly 359 includes a plurality of seals 392. More specifically, a first seal 394 is positioned within first seal gland 388 and a second seal 396 is positioned within second seal gland 390, wherein both seals 394 and 396 extend substantially radially within tip portion 312.

Also, in the exemplary embodiment, radial gap 384 is at least partially tapered. Such tapering facilitates mating up and alignment of bayonet adapter 340 and nozzle 348. Second seal 396, sometimes referred to as the main seal, facilitates manufacturing and assembly tolerances and variations of longitudinal gaps 382 and 386. First seal 382, cooperates with mating end 380, bayonet adapter 340, and radial gap 384 to facilitate alignment and mating of bayonet adapter 340 and nozzle 348, decreasing a potential for metal-to-metal contact thereof, facilitates dampening movement of bayonet adapter 340 and nozzle 348 as a result of mechanical vibration, and facilitates a reduction in foreign debris collection including, without limitation, fuel particles, within gaps 382, 384, and 386 that could potentially interfere with the operation of, or decrease an expected life of, main seal 396. Moreover, while in the exemplary embodiment, seal assembly 359 is configured and oriented as described above, alternatively, any configuration and orientation of seal assembly 359 that enables operation of seal assembly 359 and tip portion 312 as described herein is used.

Figure 9:
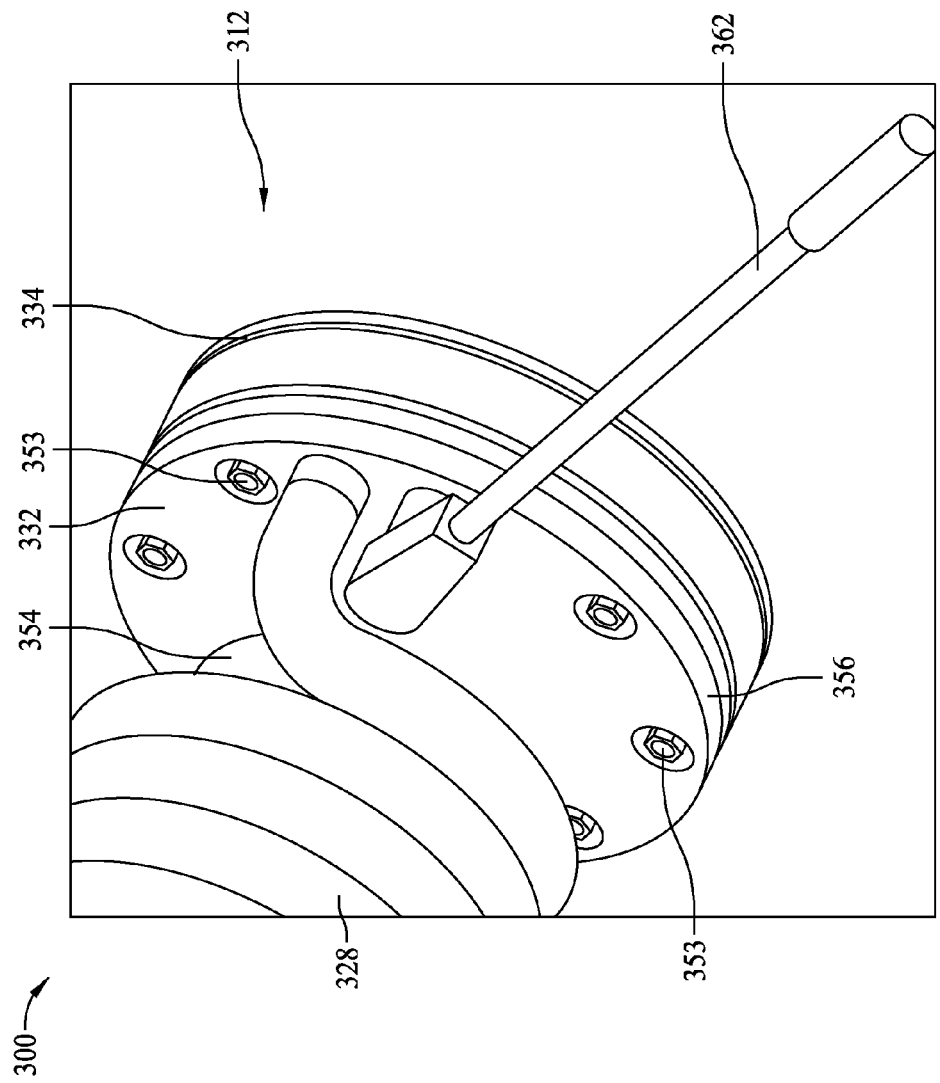
FIG. 9 is a schematic rear view of an exemplary adaptor portion that may be used with the tip portion shown in FIG. 5.

FIG. 9 is a schematic rear view of adaptor portion 332. In the exemplary embodiment, modular tip 334 is removably coupled to adapter portion 332 via retention hardware 353 using tools that include, but are not limited to, a torque wrench 362. Retention hardware 353 extends through adaptor portion 322 into modular tip portion 334, wherein hardware 353 engages both portions 332 and 334. As retention hardware 353 is tightened during assembly of tip portion 312 that includes coupling adapter portion 332 to modular tip 334, the shapes of the mating surfaces of adaptor portions 332, 338 and 340 and tip 322, seal assemblies 360 and 361 facilitate alignment and attainment of predetermined gaps (not shown) between portions 332, 338 and 340 with tip 334 to attain a predetermined gap (not shown) therebetween to further facilitate secure coupling of portions 332, 338 and 340 with tip 334. Also, specifically, seal assemblies 357, 358, and 359 facilitate providing a greater tolerance range within tip 334 to facilitate a greater tolerance for variances due to fabrication and assembly, and shifting and movement of components therein.

Therefore, in the exemplary embodiment, tip portion 312, including adapter portion 332 that is removably coupled to modular tip 334 via retention hardware 353, wherein modular tip 334 includes convergent and divergent nozzles 348, 350, and 352, facilitates assembly, disassembly, and field service of injection device 300. Moreover, modular tip 334 facilitates use of a fixed configuration therein regardless of thermal expansion effects of bayonet sections 321, 323, and 324 that may have any length and/or inherent manufacturing tolerances.

Figure 10:
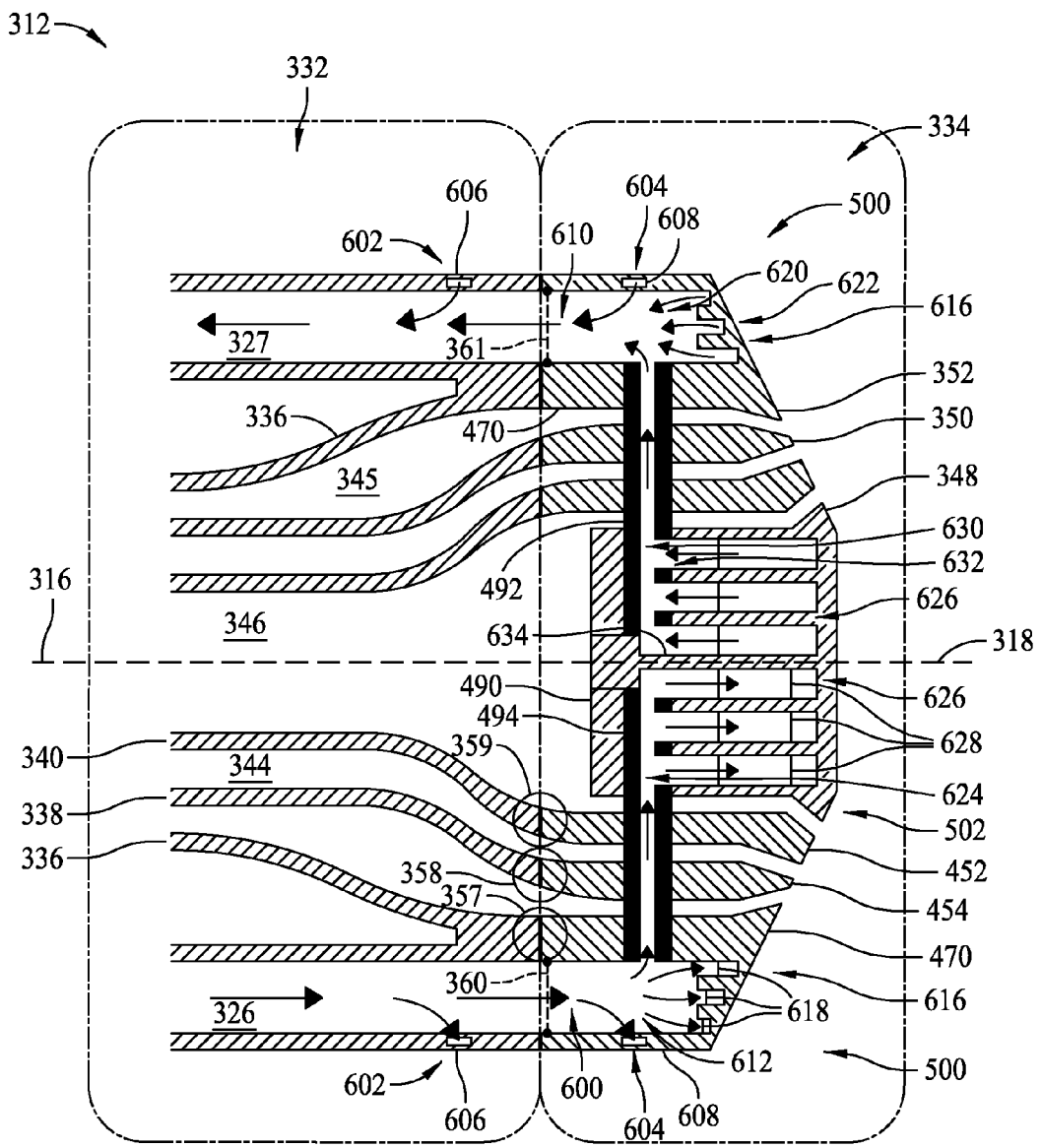
FIG. 10 is a schematic cross-sectional view of the tip portion shown in FIG. 6.

FIG. 10 is a schematic cross-sectional view of tip portion 312. Inner GOX adapter 340 (included within bayonet adapter portion 332) is substantially aligned with an inner GOX tip 452 (included within modular tip 334), and adapter 340 and tip 452 form a slip fit upon coupling of bayonet adapter portion 332 to modular tip 334. Also, seal assembly 359 is positioned between inner GOX adapter 340 and inner GOX tip 452. Seal assembly 359 is at least partially crushed, or compressed to facilitate preventing fluid from leaking between inner GOX channel 346 and slurry channel 344 at the mating surfaces (not shown) between adapter 340 and tip 452.

Inner GOX tip 452 is positioned substantially concentrically within a slurry tip 454 that is also included within modular tip 334. Optionally, at least one spacer (not shown) facilitates maintaining a predetermined spacing between inner GOX tip 452 and slurry tip 454, thereby at least partially defining slurry channel 344. Slurry adapter 338 (included within bayonet adapter portion 332) is substantially aligned with slurry tip 454, and adapter 338 and tip 454 form a slip fit upon coupling of bayonet adapter portion 332 and modular tip 334. Also, seal assembly 358 is positioned between slurry adapter 338 and slurry tip 454. Seal assembly 358 is at least partially crushed, or compressed to facilitate preventing fluid from leaking between slurry channel 344 and outer GOX channel 345 at the mating surfaces (not shown) defined between slurry adapter 338 and slurry tip 454.

Injector body, or outer GOX adapter 336 is substantially aligned with an injector body 470 of modular tip 334, and adapter 336 and body 470 form a slip fit upon coupling of bayonet adapter portion 332 and modular tip 334. Outer GOX adapter 336 and injector body 470 at least partially define outer GOX channel 345. Also, seal assembly 357 is positioned between outer GOX adapter 336 and injector body 470. Seal assembly 357 is at least partially crushed, or compressed to facilitate preventing fluid from leaking between outer oxygen channel 345 and syngas at surface 354 of outer GOX adapter 336 at the mating surfaces (not shown) defined between outer GOX adapter 336 and injector body 470.

Outer GOX adapter 336 and injector body 470 are releasably coupled, in the exemplary embodiment, by a plurality of retention hardware 353 (shown in FIGS. 7 and 9) that include threaded fasteners. Retention hardware 353 not only couples adapter portion 332 to modular tip 334, but also induces a clamping, or compressing force for seal assemblies 357, 358, 359, 360, and 361 as described above.

A GOX center body 490 is positioned within inner GOX tip 452. Slurry tip 454 is inserted within injector body 470, and slurry tip 454, inner GOX tip 452, and GOX center body 490 are maintained in position by at least one coolant spoke 492 and 494 and/or at least one support pin 498 (shown in FIG. 7). Furthermore, spokes 492 and 494 and/or support pin 498 facilitate decreasing a potential for shifting of components within modular tip 334 due to thermal expansion and contraction and manufacturing tolerances.

A radially outer cooling face plate 500 and a radially inner cooling face plate 502 may be positioned on exterior surfaces of injector body 470 and GOX center body 490. The cooling face plates 500 and 502 facilitate shielding tip portion 312 from heat damage.

Tip portion 312 includes a cooling fluid supply plenum 600 that is coupled in flow communication cooling fluid supply manifold 326. Plenum 600 is defined within injector body adaptor 336 and an adjoining opening (not shown) defined within injector body 470. In the exemplary embodiment, plenum 600 is substantially cylindrical. Alternatively, plenum 600 has any configuration that facilitates operation of tip portion 312 as described here. Plenum 600 is coupled in flow communication with an axially inner circumferential cooling channel 602 and an axially outer circumferential cooling channel 604. Channels 602 and 604 circumferentially extend about tip portion 312 and facilitate forming an axially inner circumferential cooling surface 606 and an axially outer circumferential cooling surface 608, respectively. Moreover, channels 602 and 604 are configured to channel a portion of coolant flow as illustrated by the associated arrows. Further, channels 602 and 604 and surfaces 606 and 608 are sized to facilitate heat removal from proximate portions of tip portion 312.

Tip portion 312 also includes a cooling fluid return plenum 610 that is coupled in flow communication with cooling fluid return manifold 327 and channels 602 and 604. Plenum 610 is defined within injector body adaptor 336 and an adjoining opening (not shown) defined within injector body 470. In the exemplary embodiment, plenum 610 is substantially cylindrical. Alternatively, plenum 610 has any configuration that facilitates operation of tip portion 312 as described here. Plenum 610 is configured to receive coolant flow from channels 602 and 604 (as well as additional coolant flows that is discussed further below).

Tip portion 312 further includes a radially outer coolant supply plenum 612 that is coupled in flow communication with plenum 600. Plenum 612 is defined within injector body 470 and is configured to receive at least a portion of the fluid coolant flow as illustrated with the associated arrows. Tip portion 312 also includes a plurality of cooling slots, or channels 614 formed within radially outer cooling face 500 and radially inner cooling face 502. At least a portion of each of faces 500 and 502 form a cooling surface. In the exemplary embodiment, channels 614 are substantially circumferential. Alternatively, channels 614 have any configuration that facilitates operation of tip portion 312 as described herein. Further, channels 614 and surfaces 606 and 608 are sized to facilitate heat removal from proximate portions of tip portion 312.

Channels 614 include a plurality of radially outer cooling channels 616 and at least one flow distribution device, that is, at least one radially outer cooling channel inlet orifice plate 618 that are both coupled in flow communication with plenum 612. Plate 618 is configured to control the distribution of cooling fluid through each of channels 616.

Tip portion 312 further includes a radially outer coolant return plenum 620 that is defined within injector body 470 and is configured to receive at least a portion of the fluid coolant flow discharged from channels 616 via a plurality of radially outer cooling channel outlets 622 as illustrated with the associated arrows.

Tip portion 312 also includes a radially inner coolant supply plenum 624 that is defined within injector body 470 and is coupled in flow communication with plenum 600 via coolant supply spoke 494. Channels 614 also include a plurality of radially inner cooling channels 626 and at least one radially outer cooling channel inlet orifice plate 628 that are coupled in flow communication with plenum 624. Plate 628 is configured to control the distribution of cooling fluid through each of channels 626. Plates 618 and 628 are also configured to prevent inadvertent cross-installation during fabrication and/or assembly. Tip portion 312 further includes a radially inner coolant return plenum 630 that is defined within injector body 470 and is configured to receive at least a portion of the fluid coolant flow discharged from channels 626 via a plurality of radially outer cooling channel outlets 632 as illustrated with the associated arrows. Plenum 610 is coupled in flow communication with plenum 630 via coolant return spoke 492. Tip portion 312 also includes a flow separation wall 634 that is configured to facilitate separation of coolant flows within spoke 494 and plenum 624 from coolant flows within spoke 492 and plenum 630.

In the exemplary embodiment, the plurality of plenums, channels, spokes, orifice plates and wall 634 not only facilitate coolant flow throughout tip portion 312, they also facilitate structural support of tip portion 312. Alternatively, tip portion 312 includes any structural support features that facilitate operation of tip portion 312 as described here.

Figure 11:
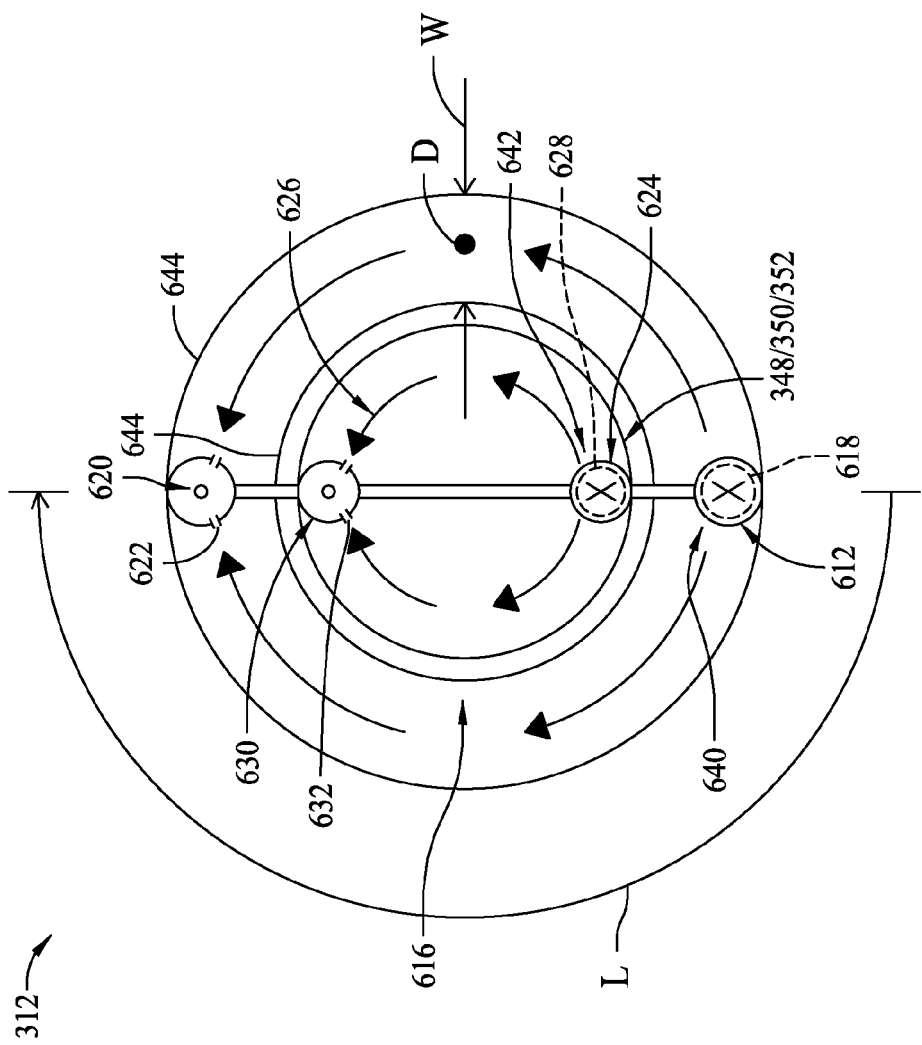
FIG. 11 is a schematic cross-sectional view of a plurality of cooling channels within the tip portion shown in FIG. 10.

FIG. 11 is a schematic cross-sectional view of a plurality of cooling channels within the tip portion. In FIG. 11, radially outer cooling face plate 500 and radially inner cooling face plate 502 (both shown in FIG. 10) are shown removed from injector body 470 and GOX center body 490, respectively (both shown in FIG. 10). As described above, cooling face plates 500 and 502 facilitate shielding tip portion 312 from heat damage.

Radially outer cooling channel inlet orifice plate 618 is coupled in flow communication with radially outer coolant supply plenum 612. Orifice plate 618 includes a plurality of orifices 640 coupled in flow communication with radially outer cooling channels 616, wherein each of orifices 640 is sized to facilitate a predetermined coolant flow rate within cooling channels 616. Channels 616 are coupled in flow communication with radially outer cooling channel outlets 622 that are, in turn, coupled in flow communication with radially outer coolant return plenum 620.

Similarly, radially inner cooling channel inlet orifice plate 628 is coupled in flow communication with radially inner coolant supply plenum 624. Orifice plate 628 includes a plurality of orifices 642 coupled in flow communication with radially inner cooling channels 626, wherein each of orifices 642 is sized to facilitate a predetermined coolant flow rate within cooling channels 626. Channels 626 are coupled in flow communication with radially inner cooling channel outlets 632 that are, in turn, coupled in flow communication with radially inner coolant return plenum 630.

In the exemplary embodiment, channels 616 and 626 are grooves defined within plates 500 and 502, respectively, by associated channel walls 644. Alternatively, channels 616 and 626 are formed in any manner than enables operation of modular tip 312 as described herein. Also, in the exemplary embodiment, channels 616 and 626 are sized with a channel radial width W to facilitate use of thinner metal for plates 500 and 502, thereby facilitating a reduction in stresses induced therein and extending a life cycle of tip portion 312. Further, in the exemplary embodiment, a channel axial depth D (shown as extending into FIG. 11) is sized to facilitate heat removal by channels 616 and 626. Moreover, in the exemplary embodiment, channel radial width W and channel axial depth D are sized in conjunction with a channel radial length L and cooling water flow to facilitate a predetermined rate of heat removal for each individual channel 616 and 626. For example, but not limited to, cooling water flow is sized to accommodated varying channel radials length L, and axial depth D is sized differently for each of channels 616 such that cooling fluid velocities within each of channels 616 is substantially similar.

Also, in the exemplary embodiment, orifice plates 618 and 628 are positioned at the inlets to channels 616 and 626, respectively. Alternatively, orifice plates are positioned at the outlets of channels 616 and 626. Also, alternatively, orifice plates are positioned at both inlets and outlets of channels 616 and 626. Further, alternatively, no orifice plates are used and coolant flow through each of channels 616 and 626 is predetermined substantially as a function of sizing, configuration, shaping, and orientation of channels 616 and 626.

Figure 12:
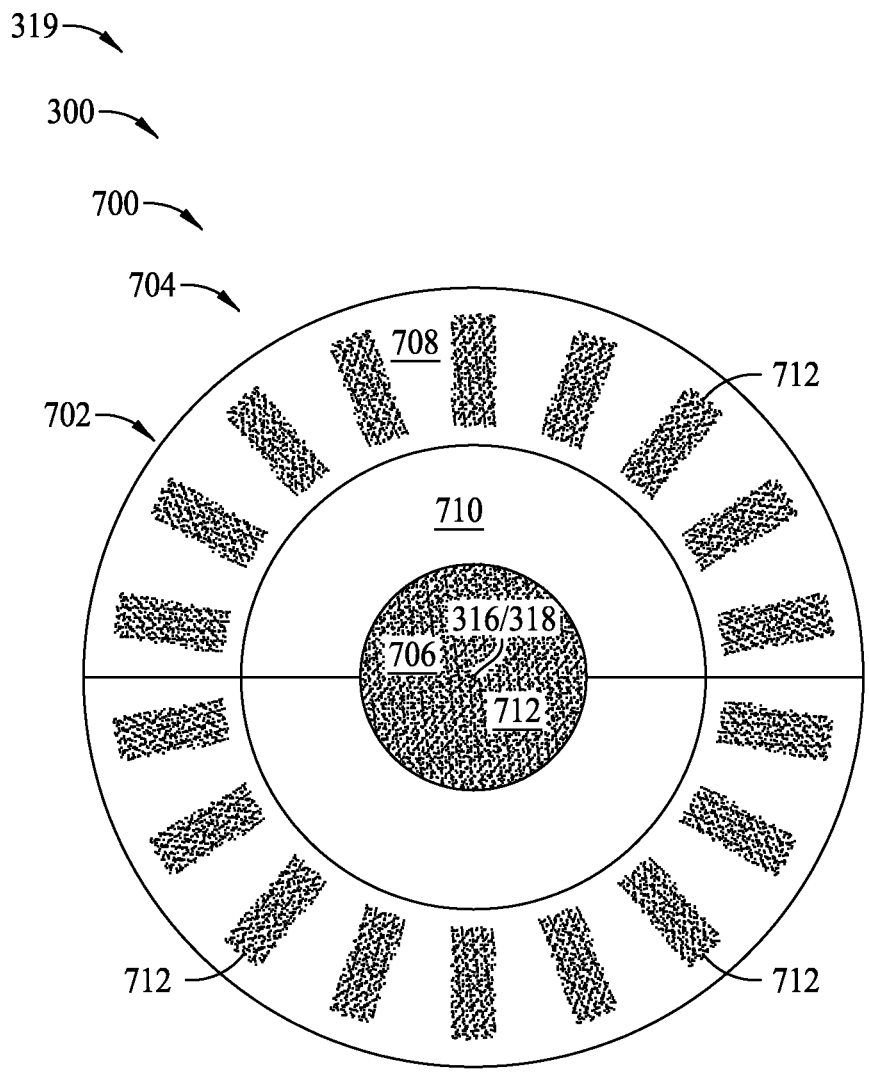
FIG. 12 is a front view of an alternative tip portion of an injection device that may be used with the injector feed assembly shown in FIG. 5.

FIG. 12 is a front view of an alternative tip portion 700 of injection device 300 that may be used with injector feed assembly 319. Tip portion 700 is similar to tip portion 312 (shown in FIGS. 2, 3, 4, 6, 7, 9, and 10) with the exception that tip portion 700 is transpiration-cooled with a fluid bleed system 702, wherein system 702 is an open cooling-type system. Also, tip portion 700 differs from tip portion 312 in that cooling fluid outlet manifold 327 (shown in FIGS. 3, 6, 10) for closed cooling is not required and may be eliminated. Alternatively, manifold 327 may be used as a redundant and/or parallel coolant supply manifold similar to cooling fluid inlet manifold 326 (shown in FIGS. 3, 6, and 10). Tip portion 700 includes an alternative modular tip 704 that is coupled to bayonet adapter portion 332 (shown in FIGS. 4, 6, 7, 9, and 10) as described above for tip portion 312 and modular tip 334 (shown in FIGS. 4, 6, 7, 9, and 10). Tip portion 700 includes an inner annular portion 706 that is aligned substantially perpendicularly to, and centered about, injection device axial centerline 316. Tip portion 700 also includes an outer annular portion 708. A plurality of annular injectors 710 that include inner GOX nozzles 348, slurry nozzles 350, and outer GOX nozzles 352 (all shown in FIGS. 6, 10, and 11) are defined between inner annular portion 706 and outer annular portion 708. In this alternative exemplary embodiment, portions 706 and 708 are unitarily formed together using any methods that enable operation of modular tip 704 as described herein including, without limitation, casting, forging, brazing, and welding.

Also, in this alternative exemplary embodiment, tip portion 700 facilitates removing heat from outer and inner annular portions 706 and 708, respectively. That is, portions of tip portion 700 including, without limitation, inner annular portion 706 and outer annular portion 708 are at least partially manufactured from a porous material 712 that facilitates a low flow rate of fluids that are either liquid or gaseous. For example, without limitation, those portions of tip portion 700 in direct thermal contact with high temperatures and chemical species in gasification cavity 302 (shown in FIG. 2) are made of porous metallic or refractory materials such as, without limitation, porous plates or shapes formed by sintering metallic wire and/or powdered super alloys that are joined to the non-porous portions of tip portion 700 by one or more methods that include, without exception, welding, brazing and other appropriate bonding techniques. Alternatively, retention hardware (not shown) is used. In this alternative embodiment, coolant flow rates are predetermined to facilitate prevention of undesirable quenching of recirculation zones 320 and 322 (both shown in FIG. 2). Furthermore, such portions also may incorporate features that enhance the efficiency of transpiration cooling, including without limitation, features that facilitate impingement cooling of the inside and outside surfaces to be cooled using the transpiration coolant.

During operation, cooling fluid is channeled to and/or within tip portion 700, and particularly to modular tip 704 and fluid bleed system 702 in a manner similar to that described above for tip portion 312 and modular tip 334. Therefore, in this alternative exemplary embodiment, fluid bleed system 702 facilitates heat removal from modular tip 704 via channeling cooling fluid therein to absorb at least some of the heat generated within modular tip 704 and channeling such heat into gasification cavity 302 via a transpiration cooling process through porous material 712. In this alternative embodiment, fluid bleed system 702 coolant flow rates are predetermined to facilitate prevention of undesirable quenching of recirculation zones 320 and 322 (shown in FIG. 2). Fluid bleed system 702 may be operated in conjunction with a closed cooling system as described above for tip portion 312.

Figure 13:
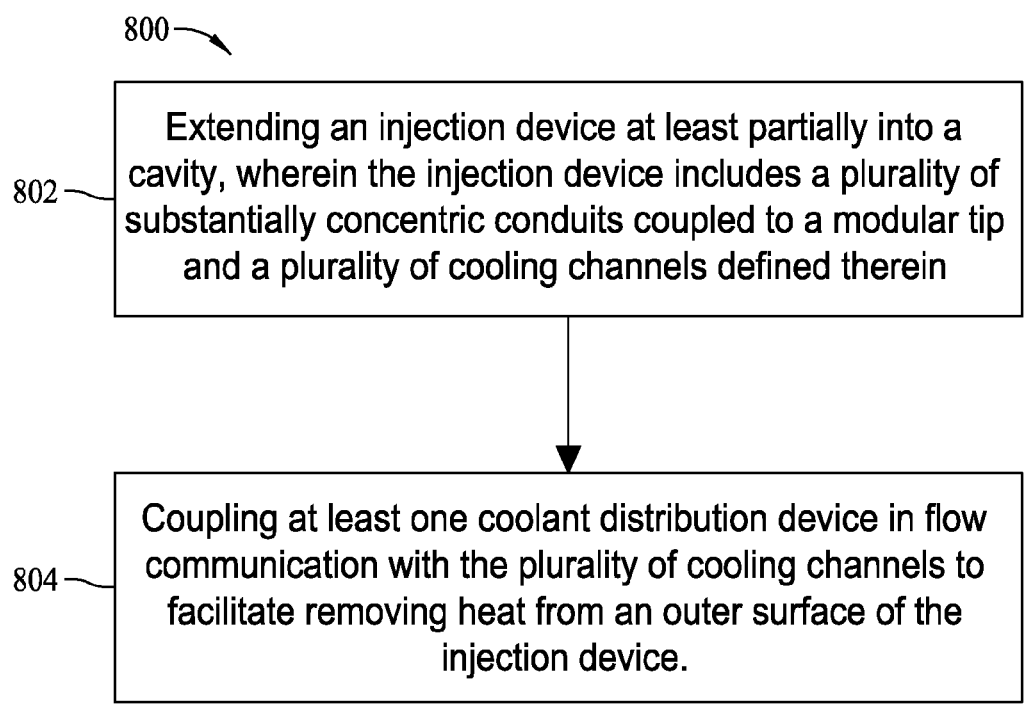
FIG. 13 is a flow chart of an exemplary method of assembling the injection device shown in FIGS. 2, 3, 10, and 12.

FIG. 13 is a flow chart of an exemplary method 800 of assembling injection device 300 (shown in FIGS. 2, 3, and 12). In the exemplary embodiment, injection device 300 is extended 802 at least partially into gasification cavity 302 (shown in FIG. 2). Injection device 300 includes a plurality of substantially concentric conduits, that is, bayonet sections 321/323/324 (all shown in FIG. 3) and/or adapters 336/338/340 (all shown in FIGS. 4, 6, and 10), coupled to modular tip 334 (shown in FIGS. 4, 6, 7, 9, and 10), and a plurality of cooling channels 602/604/614/616/626 (all shown in FIG. 10) defined therein. Also, in the exemplary embodiment, at least one coolant distribution device, such as, without limitation, coolant manifolds 326 and 327, coolant spokes 492 and 494, orifice plates 618 and 628, wall 634 (all shown in FIG. 10) and cooling fluid coils 328 (shown in FIGS. 3 and 9) and orifices 640 and 642, and wall 644 (all shown in FIG. 11), is coupled 804 in flow communication with plurality of cooling channels 602/604/614/616/626 to facilitate removing heat from an outer surface 354/356 (both shown in FIGS. 7 and 9) and 500/502/606/608 (all shown in FIG. 10) of injection device 300.

Embodiments provided herein facilitate assembly and heat removal from injection devices. Such injection devices may include a modular tip device. Using the injection devices as described herein facilitates use of such injection devices in high-temperature environments for an extended period of time without routine corrective maintenance disassembly, reassembly, and/or replacement of the injection devices, thereby reducing operational and maintenance costs associated with non-cooled injection devices.

Described herein are exemplary embodiments of heat removal apparatus that facilitate heat removal from modular tip injector devices and methods of assembling the same. Specifically, defining cooling fluid channels and positioning fluid distribution devices within a modular tip to channel cooling fluid flows to those surface regions of the modular tip most likely to be subjected to elevated temperatures facilitates heat removal from those surface regions. Therefore, a broader range of materials that may otherwise be susceptible to a decreased life cycle may be used. Moreover, using such modular tip heat removal apparatus facilitates reducing operating costs associated with retrofits, preventative maintenance, corrective maintenance, as well as inspections of, and replacement of, the modular tips of the injection devices.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assembly packages and methods.

While the invention has been described in terms of various specific embodiments, those skilled in the art will recognize that the invention can be practiced with modification within the spirit and scope of the claims.

What is claimed is:

1. An injection device for use in a reactor injector feed assembly comprising:
    a plurality of substantially concentric conduits coupled to a modular tip comprising a plurality of substantially annular nozzles;
    an outer surface extending into a cavity such that said outer surface is exposed to a source of heat within the cavity;
    a cooling fluid supply plenum;
    a cooling fluid return plenum;
    a plurality of cooling channels defined within said injection device, each of said cooling channels is at least one of radially and axially inward of said outer surface and coupled in flow communication with said cooling fluid supply and return plenums, wherein said plurality of cooling channels comprises a plurality of radially outer cooling channels, a plurality of radially inner cooling channels, and a plurality of substantially circumferential cooling channels, wherein said plurality of radially outer cooling channels comprises:
    at least one radially outer cooling channel inlet coupled in flow communication with said cooling fluid supply plenum; and
    at least one radially outer cooling channel outlet coupled in flow communication with said coolant fluid return plenum; and
    at least one coolant distribution device coupled in flow communication with said plurality of cooling channels to facilitate removing heat from at least a portion of said outer surface.

2. An injection device in accordance with claim 1, wherein said at least one coolant distribution device comprises at least one cooling channel orifice plate.

3. An injection device in accordance with claim 1, wherein:
    said plurality of radially inner cooling channels comprise:
    at least one radially inner cooling channel inlet orifice plate coupled in flow communication with said radially inner coolant supply plenum, said radially inner coolant supply plenum coupled in flow communication with said cooling fluid supply plenum via at least one coolant supply spoke; and
    at least one radially inner cooling channel outlet coupled in flow communication with radially inner coolant return plenum, said radially inner coolant return plenum coupled in flow communication with said cooling fluid return plenum via at least one coolant return spoke; and
    said plurality of substantially circumferential cooling channels comprises:
    at least one axially inner circumferential cooling channel coupled in flow communication with said cooling fluid supply plenum and said cooling fluid return plenum; and
    at least one axially outer circumferential cooling channel coupled in flow communication with said cooling fluid supply plenum and said cooling fluid return plenum.

4. An injection device in accordance with claim 1, wherein said outer surface comprises a transpiration-type open cooling system, wherein said outer surface at least partially comprises a porous material.

5. A gasification facility comprising:
    at least one carbonaceous reactant source;
    at least one oxygenated fluid reactant source;
    at least one gasification reactor comprising at least one injection device coupled in flow communication with said at least one carbonaceous reactant source and said at least one oxygenated fluid reactant source, said at least one injection device comprising:
    a plurality of substantially concentric conduits coupled to a modular tip comprising a plurality of substantially annular nozzles;
    an outer surface extending into said at least one gasification reactor such that said outer surface is exposed to a source of heat within said at least one gasification reactor;
    a cooling fluid supply plenum;
    a cooling fluid return plenum;
    a plurality of cooling channels defined within said injection device, each of said cooling channels is at least one of radially and axially inward of said outer surface and coupled in flow communication with said cooling fluid supply and return plenums, wherein said plurality of cooling channels comprises a plurality of radially outer cooling channels, a plurality of radially inner cooling channels, and a plurality of substantially circumferential cooling channels, wherein said plurality of radially outer cooling channels comprises:
    at least one radially outer cooling channel inlet coupled in flow communication with said cooling fluid supply plenum; and
    at least one radially outer cooling channel outlet coupled in flow communication with said coolant fluid return plenum; and
    at least one coolant distribution device coupled in flow communication with said plurality of cooling channels to facilitate removing heat from at least a portion of said outer surface.

6. A gasification facility in accordance with claim 5, wherein said modular tip defines at least a portion of said outer surface, said outer surface comprises:
    a plurality of first cooling surfaces that radially extend about and are spaced radially about at least a portion of said outer surface; and
    a plurality of second cooling surfaces that circumferentially extend about and are spaced circumferentially about at least a portion of said outer surface.

7. A gasification facility in accordance with claim 6, wherein:
    said plurality of first cooling surfaces comprises a radially outer cooling surface and a radially inner cooling surface; and said plurality of second cooling surfaces comprises an axially inner circumferential cooling surface and an axially outer circumferential cooling surface.

8. A gasification facility in accordance with claim 5, wherein
said at least one coolant distribution device comprises at least one cooling channel orifice plate.

9. A gasification facility in accordance with claim 5, wherein:
said plurality of radially inner cooling channels comprise:
at least one radially inner cooling channel inlet orifice plate coupled in flow communication with said radially inner coolant supply plenum, said radially inner coolant supply plenum coupled in flow communication with said cooling fluid supply plenum via at least one coolant supply spoke; and
at least one radially inner cooling channel outlet coupled in flow communication with said radially inner coolant return plenum, said radially inner coolant return plenum coupled in flow communication with said cooling fluid return plenum via at least one coolant return spoke; and
said plurality of substantially circumferential cooling channels comprises:
at least one axially inner circumferential cooling channel coupled in flow communication with said cooling fluid supply plenum and said cooling fluid return plenum; and
at least one axially outer circumferential cooling channel coupled in flow communication with said cooling fluid supply plenum and said cooling fluid return plenum.

10. A gasification facility in accordance with claim 5, wherein said outer surface comprises a transpiration-type open cooling system, wherein said outer surface at least partially comprises a porous material.

* * * * *